April 29, 1924.
A. C. LIFQUIST
TIRE PROTECTOR
Filed June 21, 1923
1,492,040
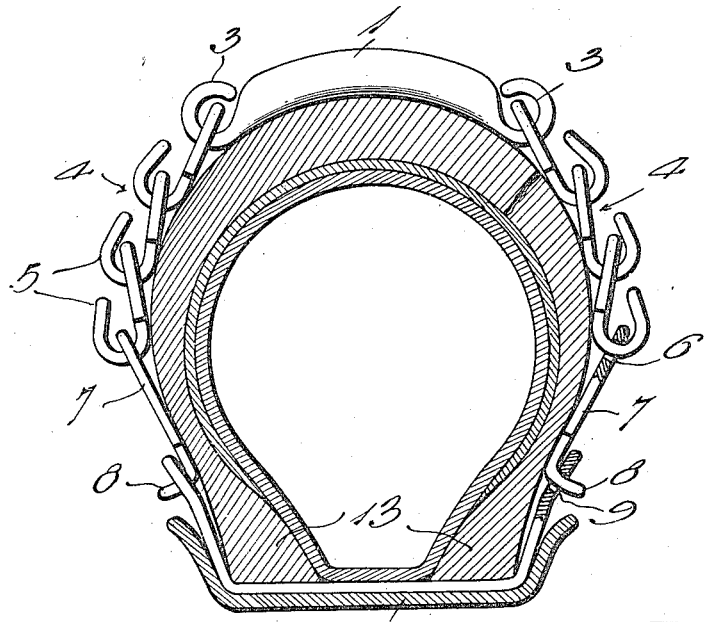
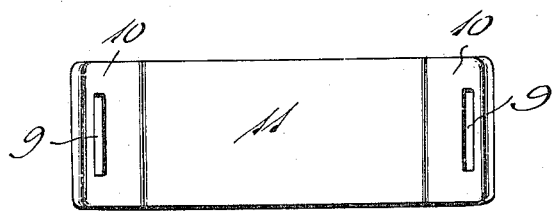
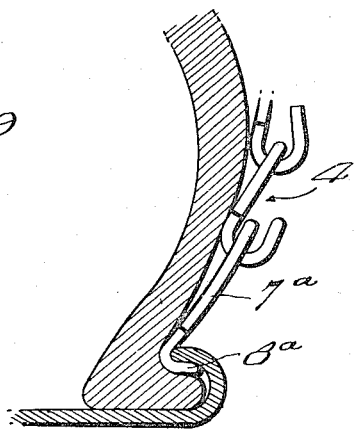
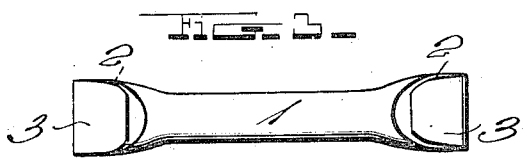
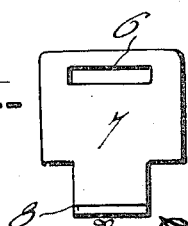
Witness
H. Woodard
Inventor
A. C. LIFQUIST
By H. Wilson & Co.
Attorneys Patented Apr. 29, 1924.

1,492,040

UNITED STATES PATENT OFFICE.

ANDREW C. LIFQUIST, OF WADENA, MINNESOTA.

TIRE PROTECTOR.

Application filed June 21, 1923. Serial No. 646,900.

*To all whom it may concern:*

Be it known that I, ANDREW C. LIFQUIST, a citizen of the United States, residing at Wadena, in the county of Wadena and State of Minnesota, have invented certain new and useful Improvements in Tire Protectors; and I do declare the following to be a full, clear, and exact description of the invention, such as will enable others skilled in the art to which it appertains to make and use the same.

This application relates to improvements in tire protecting devices and forms a continuation in part of my U. S. application, Serial No. 542,338, filed March 9, 1922.

The principal object of the invention is to provide a protector adapted to extend transversely around a tire casing to reinforce a ruptured portion of the latter and prevent an inside patch applied over the rupture, from being distorted and itself blown out, novel means being provided for anchoring the protector, including a plate for disposition between the tire casing and the rim, said plate having extended ends to which the ends of the protector are connected.

With the foregoing in view, the invention resides in the novel subject matter hereinafter described and claimed, the description being supplemented by the accompanying drawing.

Figure 1 is a transverse sectional view of an automobile tire and rim showing the application of my invention.

Figure 2 is an elevation of the anchoring plate.

Figure 3 is an elevation of the tread member of the reinforcing element.

Figure 4 is a side elevation of one of the plates at the ends of the flexible protector for detachable engagement with the ends of the anchoring plate.

Figure 5 is a detail sectional view showing a different form of construction.

In the drawing above briefly described, the numeral 1 designates a longitudinally curved tread member which is preferably formed from a single length of metal rod with its ends flattened as indicated at 2 and bent to provide a pair of eyes 3. With these eyes, a pair of flexible connectors 4 are engaged, said connectors being preferably formed of detachably connected links 5. The ends of the connectors 4 remote from the tread member 1 are hooked into slots 6 formed in a pair of plates 7, the inner ends of said plates being decreased in width and bent outwardly to provide lugs 8. These lugs are detachably received in slots 9 in the outwardly extended ends 10 of an anchoring plate 11, this plate being adapted to extend transversely of a rim 12, between the latter and the tire beads 13. When the tire is inflated, the outward pressure thereof against the plates 7, holds the lugs 8 engaged with the slots 9 but prior to inflation, it is an easy matter to insert said lugs through the slots when applying the device. It will also be seen that according to the size of the tire upon which the device is to be used, some of the links 5 may be removed from the connectors 4 or others added, as occasion may require.

The device so far described is intended primarily for use upon straight side tires and rims and if it is to be used upon a clincher rim and tire, the plate 7ª shown in Fig. 5 may be substituted for the plate 7, said plate 7ª being provided with a hook 8ª to engage the usual clincher rim.

By the construction shown or a substantial equivalent thereof, a simple and effective device is provided for reinforcing tire casings either before or after they have been ruptured and furthermore it will be seen that the device will form an effective mudlug if its use for this purpose should be desirable.

Excellent results have been obtained from the details disclosed and they are therefore preferably followed, but within the scope of the invention as claimed, numerous minor changes may be made.

I claim:

1. A tire protector comprising an anchoring plate adapted for disposition between the tire and its carrying rim, said plate being adapted to extend transversely between the side flanges of the rim, and a flexible tire reinforcing element to extend transversely around the tire casing, said element being connected at its ends with said plate.

2. A tire protector comprising an anchoring plate adapted for disposition between the casing and rim, said plate being designed to extend transversely across the base of the rim and having its opposite ends bent laterally to extend beyond the free edges of the rim flanges, and a flexible tire reinforcing element to extend transversely around the exterior of the tire casing, said element having its ends connected with said extended ends of said plate.

3. A tire protector comprising an anchoring plate adapted for disposition between the casing and rim, said plate being designed to extend transversely across the base of the rim and having its opposite ends bent laterally to extend beyond the free edges of the rim flanges, the extended ends of said plate being provided with openings, a pair plates engaging the inner sides of said extended plate ends and having outwardly extending lugs received in said openings and adapted to be held in the latter by outward pressure of the tire on said plates, a tread member to extend across the tread of the tire, and flexible connectors between said tread member and said plates.

In testimony whereof I have hereunto affixed my signature.

ANDREW C. LIFQUIST.